Sept. 26, 1961 G. A. LYON 3,001,826
WHEEL COVER
Filed March 20, 1958 2 Sheets-Sheet 2
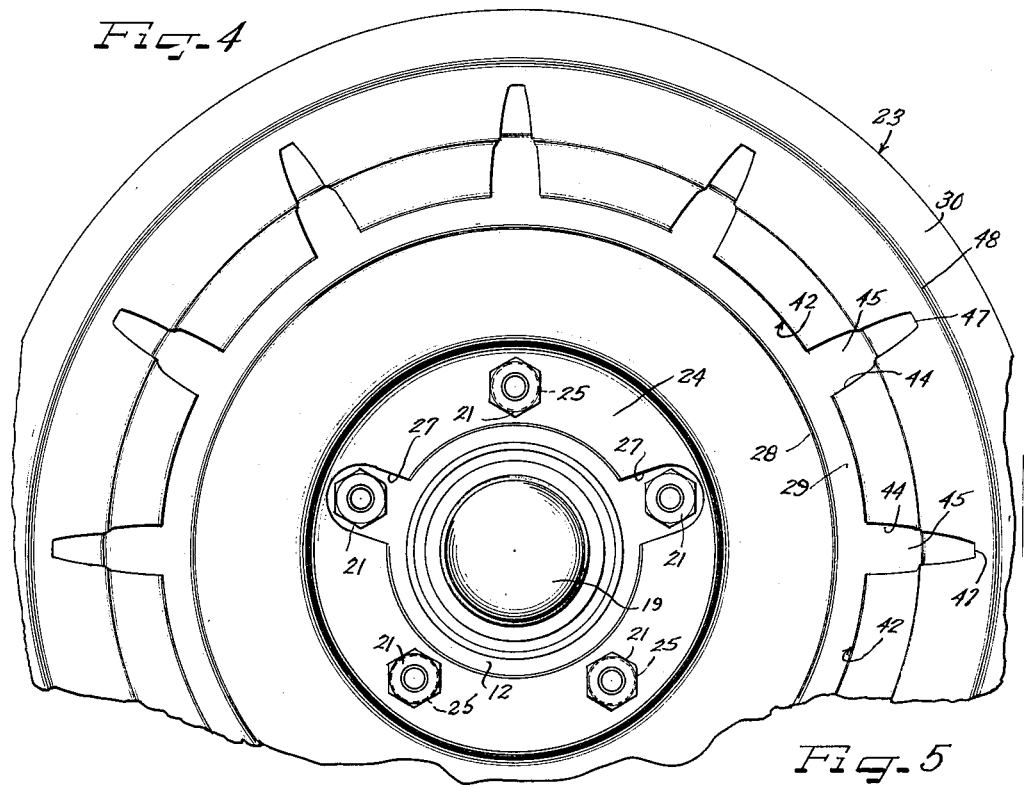
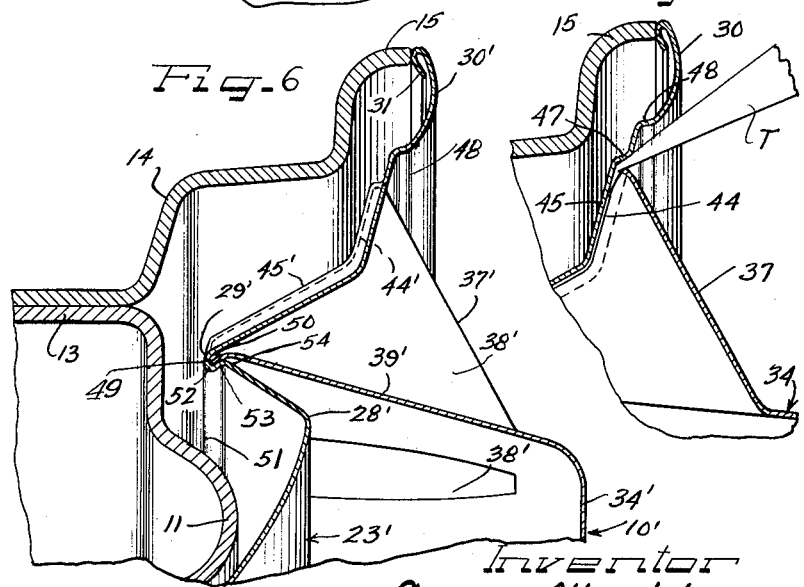
Inventor
George Albert Lyon
by Hill, Sherman, Meroni, Gross & Simpson Attys.

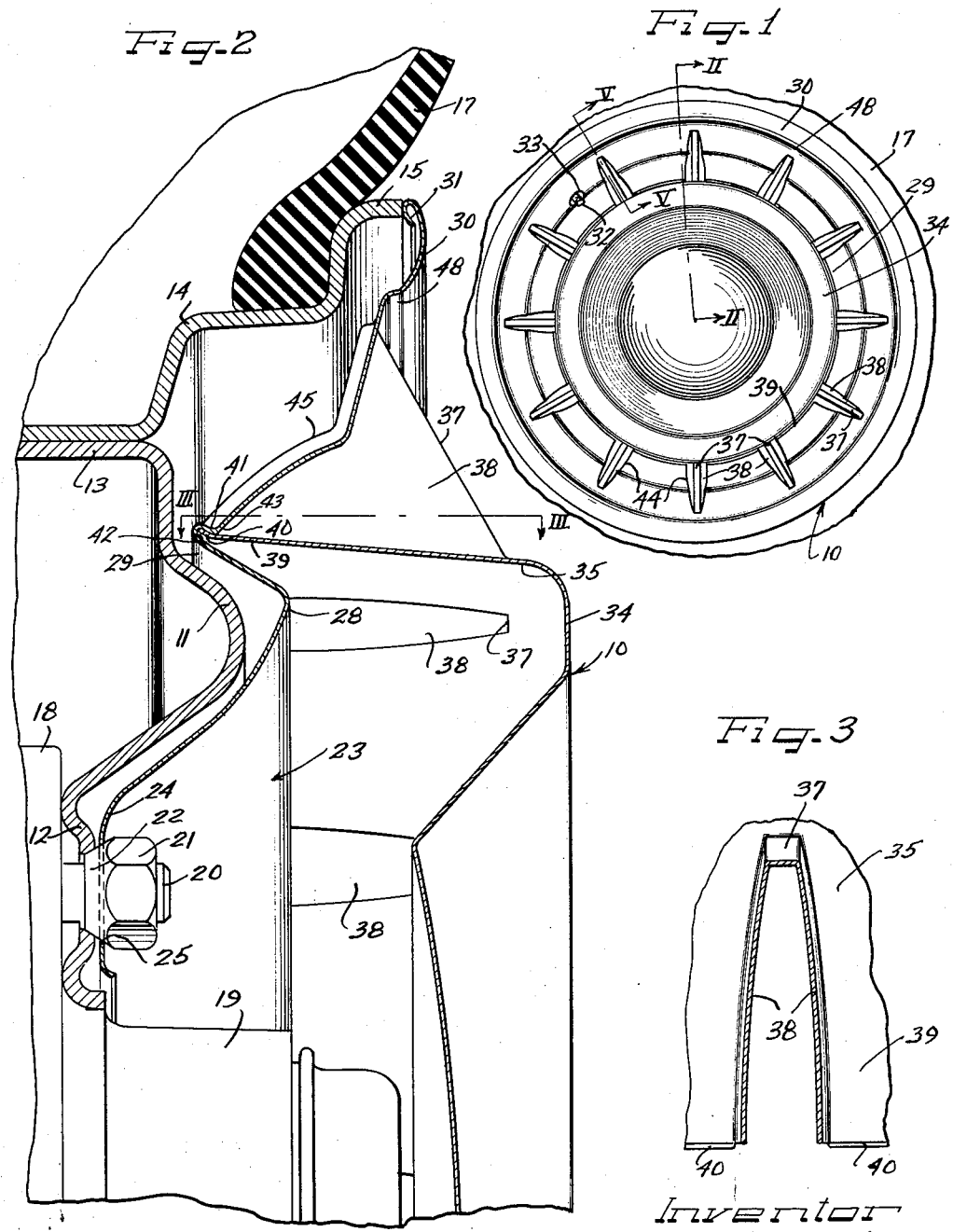

3,001,826
WHEEL COVER
George Albert Lyon, 13881 W. Chicago Blvd., Detroit 28, Mich.
Filed Mar. 20, 1958, Ser. No. 722,666
11 Claims. (Cl. 301—37)

The present invention relates to improvements in the ornamental and protective covering of the outer sides of vehicle wheels.

One of the problems with more or less expensive wheel covers is that of theft. It is therefore desirable to provide some deterrent upon too easy removal of such wheel covers. Where a plurality of tools is required and a plurality of manipulations to remove the cover, a substantial deterrent upon theft is imposed.

It is accordingly an important object of the present invention to provide an improved wheel structure wherein a cover assembly is provided requiring a plurality of manipulations with a plurality of different tools in order to effect removal of the cover and thus imposing a substantial deterrent upon theft.

Another object of the invention is to provide an improved wheel structure wherein a cover is provided that is in two parts, one of which is adapted to be attached to the wheel by means of certain of the bolts normally used in attaching the wheel to an axle structure of a vehicle, and a second cover part is adapted to be assembled with the first cover in snap-on, pry-off relation.

A further object of the invention is to provide an improved wheel cover affording an attractive, sturdy assembly wherein components of the cover are adapted to be assembled in press-on, pry-off relation and when in assembly afford mutual reinforcement and resistance against deformation and displacement.

Still another object of the invention is to provide an improved wheel cover affording a spoke simulating arrangement in a snap-on, pry-off relationship and with spoke portions providing pry-off shoulders.

Yet another object of the invention is to provide an improved cover assembly wherein one cover member is applied in press-on, pry-off relation to another cover member and an advantageous relationship of pry-off shoulders is afforded on and adjacent to the spoke portions to facilitate separation of the cover members.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary sectional elevational detail view taken substantially on the line III—III of FIGURE 2;

FIGURE 4 is a fragmentary elevational view of the wheel and outer side of the bolt attached cover member with the central crown cover member removed;

FIGURE 5 is a fragmentary sectional detail view taken substantially on the line V—V of FIGURE 1 and on an enlarged scale; and FIGURE 6 is a radial sectional detail view similar to FIGURE 2 but showing a modification.

Referring to FIGURES 1 and 2, a wheel cover assembly 10 is constructed and arranged to be applied to the outer side of a vehicle wheel such as an automobile wheel including a disk spider body 11 having a central bolt-on flange 12 and a radially outer marginal attachment flange 13 suitably secured to a tire rim 14 of the multi-flange, drop center type including a terminal flange 15 and adapted to support a pneumatic tubeless tire 17. Attachment of the wheel to a flange 18 of an axle hub 19 is adapted to be effected by means of cap screws or bolts 20 carrying nuts 21 provided with generally wedge shaped retaining end faces 22. Attachment and removal of the wheel may be effected in the usual way by appropriately manipulating the nuts 21 by means of a suitable wrench.

According to the present invention, a circular cover member 23 of a diameter to overlie not only the wheel body 11 but also the tire rim 14 is constructed and arranged to be attached to the wheel by means of the attachment bolts 20 and the nuts 21. To this end, the circular cover member 23 includes a central bolt-on flange 24 generally complementary to the bolt-on flange 12 of the wheel body and having a plurality of apertures 25 dimensioned to be engaged at the edges defining the same by the retaining shoulders 22 of the respective nuts 24. Herein there are three of the apertures 25 to receive three of the nuts 21 as best seen in FIGURE 4 generally triangularly disposed, while there are two generally opposite slots 27 provided for clearing two of the attachment bolts so as to enable attachment of the wheel by means of the two opposite bolts before application of the cover and then tightening of the cover at the same time as completing the attachment of the wheel by means of the remaining bolts.

Radially outwardly from the attachment flange 24 the cover 23 extends radially and outwardly to overlie the usual nose bulge of the wheel body 11 and with an annular bulged portion 28 of the cover member overlying the nose bulge, with a generally axially inwardly indented or dished portion 29 of the cover being disposed to lie opposite the radially outer portion of the wheel body. At its radially outer side the indented or dished annular portion 29 of the cover extends generally radially and axially outwardly to an annular marginal portion 30 having an underturned reinforcing and finishing flange 31 which is adapted to lie against the tip of the terminal flange 15 and thus determine the axially inward disposition of the cover member 23 against the wheel, with the bolt-on flange 24 of the cover member drawn axially inwardly under tension toward the wheel and thus drawing the turned edge 31 snugly against the terminal flange 15 under tension. In the attached condition of the cover member 23, a valve stem 32 projects through a suitable valve stem aperture 33 in the radially outer annular portion of the cover.

In order to enclose the wheel hub 19 and conceal the bolt-on flange 24 and the attachment bolts of the wheel, as well as to afford a crown for the cover, a central generally circular crown cover member 34 is provided which is of a diameter to overlie the central portion of the cover member 23 axially outwardly therefrom and to provide a chamber within which the wheel hub 19 is accommodated. For attaching the cover member 34 in press-on, pry-off relation to the axially inner cover member 23, the crown cover member is provided with a circular generally axially inwardly extending side wall 35 dimensioned to engage at its axially inner end within the generally axially outwardly opening groove defined by the indented or dished intermediate portion 29 of the cover member 23. In addition, the crown cover member side wall is provided with a circumferentially spaced series of generally radially outwardly projecting buttress-like spoke-like projections 37 which are formed integrally in one piece with the side wall 35, slope generally radially outwardly and axially inwardly and have generally flaring resilient side walls 38 (FIGS. 1 and 3) which join intervening segmental panels 39 of the side wall 35.

Advantage is taken of the resilient flexibility of the hollow, shell-like spoke projections 37 and the intervening side wall segmental portions 39 for snap-on, pry-off interengagement with the cover member 23. To this end, the axially inner extremities of the side wall panel segments 39 are provided with respective retaining terminal structure, herein comprising a turned terminal flange 40 projecting generally axially inwardly and, in this instance, generally radially outwardly. Each of the retaining terminals 40 provides a shoulder engageable retainingly behind a shoulder 41 provided on the cover member 23 and in the present instance comprising an overhanging wall defining a generally axially outwardly and radially inwardly opening groove 42 in the bottom of the intermediate indented portion 29 of the inner cover member. In order to enable entry of the terminal flange 40 into the groove 42, the mouth of the groove is slightly larger than the radial projection of the terminal flange from the contiguous normal plane portion of the associated segmental wall panel 39. A snug, rattle free interengagement of the retaining terminal flange 40 with the shoulder 41 is assured by having the shoulder 41 on a diameter that is slightly smaller than the diameter to which the terminal flange 40 normally projects.

In applying the central cap cover member 34 to the inner supporting cover member 23, general coaxial registration of the cover members is effected by bringing the inner end portions of the crown member segmental side wall panels 39 toward the indented intermediate portion 29, the annular hump rib 28 assisting in attaining concentricity. Continued relative axial assembly movement brings the free extremities of the retaining terminal flanges 40 into engagement with generally radially and axially inwardly sloping lead-in cam surfaces 43 at the radially outer side of the mouth of the groove 42 so that axially inward pressure on the cover member 34 causes the terminal flanges 40 to cam inwardly until they snap in behind the respective shoulders 41. In accomplishing this, resiliency of the panel portions 39 and the spoke projections 37 and especially the side walls 38 thereof enables the yielding deflection generally radially inwardly of the relatively stiff, short terminals 40 until they snap in behind the retaining shoulders 41. After interengagement has been effected between the retaining terminal flange shoulders 40 and the retaining shoulders 41, the uniform resiliency of the panel segments 39 and the spoke projections 37 maintains the shoulders in tensioned interengagement.

At the same time that the retaining terminals 40 engage within the grooves 42, the generally axially inwardly directed edges of the side walls 38 and the tip portions of the spoke projections 37 are engaged within respective recesses 44 provided conformably to receive the same in the cover member 23 radially outwardly from the groove structure 42 (FIGS. 1, 2 and 4) and defined by respective embossments 45. The side walls defining the recesses 44 and the end wall thereof affords solid abutments protectively encompassing the axially inner edges defining the spoke projections 38, thereby resisting circumferential deflection of the respective comparatively thin spoke projections 37 and retaining the cover member 34 corotative with the supporting cover member 23 which in turn is held corotative with the wheel by the attachment bolts. It will be observed that the circumferentially directed ends of the respective grooves 42 between the several recesses 44 open into the recesses, thus enabling the circumferential side extremities of the retaining terminal flanges 40 to merge directly into the adjacent ends of the side walls 38 of the spoke projections.

For removing the central cap cover member 34 from the supporting cover member 23, the retaining terminal flanges 40 are disengaged from the retaining shoulders 41 as by means of a pry-off tool T (FIG. 5). Conveniently the pry-off tool is applied under the tip of a selected one of the spoke projections 37 into the recess 44 within which the edge of the spoke projection is seated and pry-off leverage is then exerted generally axially outwardly by fulcruming the tip portion of the pry-off tool against a pry-off shoulder 47 defining the radially outer end of the recess 44. As the pry-off leverage proceeds, the pry-off tool fulcrums against a second radially outwardly spaced annular pry-off shoulder 48 provided at the radially inner side of the marginal portion 30 of the cover. Due to the resiliency of the spoke projection 37 against which pry-off leverage is exerted, and the resiliency of the contiguous panel segment portions 39 the associated terminal flanges 40 are cammed generally axially outwardly along the retaining shoulders 41 until they snap free therefrom. In order fully to release the cover member 34 it may be necessary to apply pry-off leverage to several of the spoke projections 37 in succession.

Inasmuch as the outer cap cover member 34 is removable from the supporting cover member 23 only with some difficulty and is useful only when assembled with the complementary supporting cover member 23, theft of the cover assembly is substantially deterred. Even after the outer cover member 34 has been removed, it is necessary to remove the cover member 23 from the wheel and this requires a different removal tool, namely a wrench to release the bolts that retain the inner cover member 23. Nevertheless, removal of the cover assembly from the wheel in the infrequent intervals necessary such as for rotating wheels or changing tires can be effected readily. When the wheel is to be removed from the axle, after the outer cap cover member 34 has been dislodged from the supporting cover member 23, no additional removal manipulation is required than is necessary in any event to remove the wheel. Therefore, for legitimate purposes, there is no substantial impediment to ready removal of the wheel since pry-off of the cap cover member 34 is only a little more difficult than the more generally used covers of the one-piece type.

If preferred, the slightly modified structure shown in FIGURE 6 may be used. In this form, the wheel itself and the cover components are substantially the same as in the form of FIGURES 1–5, and therefore primed reference numerals indicate substantial identity of elements. The principal difference resides in that for retaining the cap cover member 34' on the supporting cover member 23', generally radially and axially inwardly directed respective retaining terminal flanges 49 are provided on the axially inner ends of the wall segment portions 39', substantially reinforced by turned over reinforcing flanges 50 in each instance. For receiving the retaining flange terminals 49, the indented cover portion 29' is provided with a generally radially and axially inwardly directed annular juncture fold 51 providing a generally radially and axially outwardly opening groove 52 at the axially outer side of the cover member 23' defined on the radially inner side thereof by a generally radially outwardly and axially inwardly facing retaining shoulder 53 behind which the respective retaining terminal flange 49 is engageable in press-on, pry-off relation. A lead-in cam surface 54 is provided at the radially inner side of the groove 52. In this instance, the retaining shoulder terminal flanges 49 normally project to a slightly smaller diameter than the diameter of the retaining shoulder 53 so that after the retaining flanges 49 have been snapped into retaining engagement within the groove 52, there will be maintained a tensioned interengagement of the retaining shoulders of the two cover members. Press-on and pry-off of the cover member 34' is effected similarly as described in connection with the cover member 34. Other characteristics of the cover assembly 10' will be understood to be substantially the same as described for the cover 10.

Either of the covers 10 or 10' may be made in both of the components thereof from suitable material such as stainless steel, brass, aluminum, or a combination, insofar as the different components are concerned, adapted to be shaped by suitable manufacturing processes such as die stamping or drawing. It will also be apparent that the composite cover lends itself well to various ornamental effects by way of finish on the cover components.

It will be understood that modifications and variations may be effected without departing from the scope of the novel concepts of the present invention.

I claim as my invention:

1. In a wheel structure including a tire rim and a wheel body supporting the same and having a bolt-on flange for attachment by means of retaining bolts to a vehicle axle part, a cover assembly for disposition in overlying relation to the wheel including a circular cover member for overlying the tire rim and the wheel body and having a central bolt-on flange for attachment to the wheel by means of the wheel bolts, and a second cap cover member for overlying the central portion of the circular cover member, said circular cover member having retaining groove structure thereon, said cap cover member having a plurality of retaining terminal flanges on a generally axially inwardly projecting edge thereof engageable in snap-on, pry-off relation with said groove structure, said edge structure of the cap cover member having a configuration providing a plurality of generally radially extending hollow spoke-like projections opening into the interior of the cap cover member and through said edge and thereby dividing the edge into intervening resilient segmental areas with the retaining terminal flanges on said segmental areas and spaced from one another by the hollow projections.

2. In a wheel structure including a tire rim and a wheel body supporting the same and having a bolt-on flange for attachment by means of retaining bolts to a vehicle axle part, a cover assembly for disposition in overlying relation to the wheel including a circular cover member for overlying the tire rim and the wheel body and having a central bolt-on flange for attachment to the wheel by means of the wheel bolts, and a second cap cover member for overlying the central portion of the circular cover member, said circular cover member having retaining groove structure thereon, said cap cover member having a plurality of retaining terminal flanges on a generally axially inwardly projecting edge thereof engageable in snap-on, pry-off relation with said groove structure, said edge structure of the cap cover member having a configuration providing a plurality of generally radially extending spoke-like projections and intervening resilient segmental areas with the retaining terminal flanges on said segmental areas, said circular cover member having inset seats within which said spoke-like projections are engaged.

3. In a wheel cover assembly for disposition over the outer side of a vehicle wheel, a circular cover member having means thereon for attachment to a wheel, and a cap cover member for disposition over the central portion of said circular cover member, one of said cover members having a groove therein defined in part by a generally axially inwardly facing shoulder and the other of said cover members having a complementary resiliently supported retaining shoulder flange structure engageable in press-on, pry-off relation with the groove shoulder, said cap cover member having a generally radially extending series of circumferentially spaced spoke-like projections thereon and extending substantially radially beyond said retaining shoulder flange structure and engageable by a pry-off tool to pry the cap cover member from said circular cover member.

4. In a cover assembly including a circular cover member having means for attachment to a vehicle wheel, a second cover member for attachment in press-on, pry-off relation upon the circular cover member, said circular cover member having an annular generally dished portion opening axially outwardly and provided with a circumferentially disposed generally radially opening groove therein defined in part by a generally axially inwardly facing shoulder, and the second cover member having a plurality of generally radially oppositely extending edge terminal flanges engageable in press-on, pry-off relation within the groove behind said shoulder, said cover members having circumferentially facing confronting portions thereof maintaining the cover members corotative.

5. In a cover assembly including a circular cover member having means at the central portion thereof for attachment to a wheel, and a central closure cap cover member for concealing and enclosing said central portion of the circular cover member, said closure cover member having a side wall with plurality of generally radially extending and circumferentially spaced hollow spoke-like projections opening through the side wall and dividing it into intervening resilient segmental side panel portions separated circumferentially from one another by said projections and terminating in retaining flanges, said circular cover member having retaining shoulder portions engageable in press-on, pry-off relation by said retaining terminal flanges.

6. In a cover assembly including a circular cover member having means at the center thereof for attachment to a wheel, and a central closure cap cover member for concealing and enclosing said central portion of the circular cover member, said closure cover member having a plurality of generally radially extending and circumferentially spaced spoke-like projections with intervening resilient segmental side panel portions terminating in retaining flanges, said circular cover member having retaining shoulders engageable in press-on, pry-off relation by said retaining terminal flanges, said circular cover member having complementary recesses into which the axially inwardly facing portions of said spoke-like projections are engaged protectively and to retain the cover members corotatively.

7. In a cover assembly including a circular cover member for disposition over a vehicle wheel and having a central portion for attachment to the central portion of the wheel, a protective and concealing cap cover member for disposition over the central portion of said circular cover member, said cap cover member having a generally radially facing side wall with radially projecting integral spoke-like projections extending therefrom to a substantial distance radially outwardly therebeyond and hollow both axially inwardly and radially inwardly and with the side walls of the spoke projections joining segmental panel portions of the cap cover member side wall intervening between the projections, said panel segments having on the axially inner extremities thereof retaining terminals and the circular cover member having retaining shoulder means engageable in press-on, pry-off relation by said terminals.

8. In a cover assembly including a circular cover member for disposition over a vehicle wheel and having a central portion for attachment to the central portion of the wheel, a protective and concealing cap cover member for disposition over the central portion of said circular cover member, said cap cover member having a generally radially facing side wall with radially projecting integral spoke-like projections extending therefrom and hollow both axially inwardly and radially inwardly and with the side walls of the spoke projections joining segmental panel portions of the cap cover member side wall intervening between the projections, said panel segments having on the axially inner extremities thereof retaining terminals and the circular cover member having retaining shoulder means engageable in press-on, pry-off relation by said terminals, said circular cover member having complementary depressions within which the axially inwardly directed edges defining said spoke projections are protectively engageable and with a pry-off shoulder at the radially outer end of each of said depressions engageable by a pry-off tool inserted behind the tip of the respective spoke projection for prying the cap cover member from the circular cover member.

9. In a cover assembly including a circular cover member for disposition over a vehicle wheel and having a central portion for attachment to the central portion of the wheel, a protective and concealing cap cover member for disposition over the central portion of said circular cover member, said cap cover member having a generally radially facing side wall with radially projecting integral spoke-like projections extending therefrom and hollow both axially inwardly and radially inwardly and with the side walls of the spoke projections joining segmental panel portions of the cap cover member side wall intervening between the projections, said panel segments having on the axially inner extremities thereof retaining terminals and the circular cover member having retaining shoulder means engageable in press-on, pry-off relation by said terminals, said circular cover member having complementary depressions within which the axially inwardly directed edges defining said spoke projections are protectively engageable and with a pry-off shoulder at the radially outer end of each of said depressions engageable by a pry-off tool inserted behind the tip of the respective spoke projection for prying the cap cover member from the circular cover member, said shoulders on the circular cover member comprising a groove structure opening into said depressions.

10. In a cover assembly including a circular cover member for disposition over a vehicle wheel and having a central portion for attachment to the central portion of the wheel, a protective and concealing cap cover member for disposition over the central portion of said circular cover member, said cap cover member having a generally radially facing side wall with radially projecting integral spoke-like projections extending therefrom and hollow both axially inwardly and radially inwardly and with the side walls of the spoke projections joining segmental panel portions of the cap cover member side wall intervening between the projections, said panel segments having on the axially inner extremities thereof retaining terminals and the circular cover member having retaining shoulder means engageable in press-on, pry-off relation by said terminals, said circular cover member having complementary depressions within which the axially inwardly directed edges defining said spoke projections are protectively engageable and with a pry-off shoulder at the radially outer end of each of said depressions engageable by a pry-off tool inserted behind the tip of the respective spoke projection for prying the cap cover member from the circular cover member, said circular cover member having an annular pry-off rib located in radially outwardly spaced relation to the pry-off shoulders at the radially outer ends of said depressions.

11. In a cover assembly including a circular cover member having means for attachment to a vehicle wheel, a second cover member for attachment in press-on, pry-off relation upon the circular cover member, said circular cover member having an annular portion thereof provided with a groove formation defined in part by a generally axially inwardly facing shoulder, said second cover member having a circumferentially spaced series of generally radially extending spoke-like formations with ends engageable by a pry-off tool, said second cover member having at intervals thereon between said spoke-like formations resiliently flexible terminals engageable in snap-on, pry-off relation with said shoulder.

References Cited in the file of this patent

UNITED STATES PATENTS

| | | |
|---|---|---|
| 1,320,551 | Holley | Nov. 4, 1919 |
| 2,276,405 | Lyon | Mar. 17, 1942 |
| 2,460,784 | Lyon | Feb. 1, 1949 |
| 2,491,506 | Lyon | Dec. 20, 1949 |
| 2,537,072 | Lyon | Jan. 9, 1951 |
| 2,819,929 | Hunt | Jan. 14, 1958 |